(12) United States Patent
Kurtz

(10) Patent No.: US 10,605,159 B2
(45) Date of Patent: *Mar. 31, 2020

(54) ENGINE BRAKING FOR AN OPPOSED PISTON THAT INCLUDES A MECHANICALLY DRIVEN SUPERCHARGER

(71) Applicant: Ford Global Technologies, LLC, Dearborn, MI (US)

(72) Inventor: Eric Matthew Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/707,460

(22) Filed: Sep. 18, 2017

(65) Prior Publication Data

US 2019/0085759 A1   Mar. 21, 2019

(51) Int. Cl.
| | |
|---|---|
| *F02B 37/22* | (2006.01) |
| *F01B 7/14* | (2006.01) |
| *F02D 41/12* | (2006.01) |
| *F02D 41/00* | (2006.01) |
| *F01L 13/06* | (2006.01) |

(Continued)

(52) U.S. Cl.
CPC ............ *F02B 37/225* (2013.01); *F01B 7/14* (2013.01); *F01L 13/06* (2013.01); *F02B 37/04* (2013.01); *F02D 13/04* (2013.01); *F02D 41/0005* (2013.01); *F02D 41/005* (2013.01); *F02D 41/0007* (2013.01); *F02D 41/123* (2013.01); *F01L 1/38* (2013.01); *F01L 9/02* (2013.01); *F02B 3/06* (2013.01); *F02B 25/08* (2013.01); *F02B 75/282* (2013.01); *F02B 2075/025* (2013.01); *F02D 2200/0802* (2013.01); *F02D 2200/101* (2013.01); *F02D 2400/04* (2013.01)

(58) Field of Classification Search
CPC .... F02B 25/08; F01B 7/02; F01B 7/14; F02D 13/04; F02D 41/0005; F02D 2009/0242; F02D 9/06; F01L 13/06; F01L 2760/00; F01L 2760/003–005
See application file for complete search history.

(56) References Cited

U.S. PATENT DOCUMENTS

| | | | | |
|---|---|---|---|---|
| 4,799,466 A | * | 1/1989 | Shibata | ............... F02D 41/0005 123/327 |
| 5,335,500 A | * | 8/1994 | Wunderlich | ............ F02B 37/04 123/561 |

(Continued)

FOREIGN PATENT DOCUMENTS

JP    2012097629 A  *  5/2012

OTHER PUBLICATIONS

Kurtz, Eric, "System and Method for Engine Braking," U.S. Appl. No. 15/707,382, filed Sep. 18, 2017, 48 pages.

*Primary Examiner* — Laert Dounis
(74) *Attorney, Agent, or Firm* — Geoffrey Brumbaugh; McCoy Russell LLP

(57) ABSTRACT

Methods and systems for providing engine braking for a two stroke diesel engine are described. In one example, a flow through a mechanically driven supercharger is adjusted to provide engine braking for a two stroke diesel engine when engine braking is requested. The level or amount of engine braking may be adjusted via increasing or decreasing flow through the mechanically driven supercharger.

16 Claims, 6 Drawing Sheets

(51) Int. Cl.
  *F02B 37/04*   (2006.01)
  *F02D 13/04*   (2006.01)
  *F02B 3/06*    (2006.01)
  *F01L 1/38*    (2006.01)
  *F01L 9/02*    (2006.01)
  *F02B 25/08*   (2006.01)
  *F02B 75/28*   (2006.01)
  *F02B 75/02*   (2006.01)

(56) References Cited

U.S. PATENT DOCUMENTS

| | | | |
|---|---|---|---|
| 6,216,459 B1* | 4/2001 | Daudel | F02B 37/025 |
| | | | 60/602 |
| 2012/0125298 A1* | 5/2012 | Lemke | F01B 7/14 |
| | | | 123/51 B |
| 2012/0210985 A1 | 8/2012 | Fuqua et al. | |
| 2014/0298802 A1* | 10/2014 | Suzuki | F02D 13/02 |
| | | | 60/602 |
| 2014/0325962 A1* | 11/2014 | Nagaoka | F02D 41/0275 |
| | | | 60/274 |
| 2015/0240708 A1* | 8/2015 | Kostrzewski | F02B 37/24 |
| | | | 60/601 |
| 2016/0169127 A1 | 6/2016 | Rammer et al. | |
| 2018/0119625 A1* | 5/2018 | Dane | F02D 41/0007 |

\* cited by examiner

ENGINE BRAKING FOR AN OPPOSED PISTON THAT INCLUDES A MECHANICALLY DRIVEN SUPERCHARGER

BACKGROUND/SUMMARY

An opposed piston two stroke diesel engine may have advantages over a four stroke diesel including reduced mechanical complexity, reduced displacement for equivalent power, and reduced fuel consumption. However, a four stroke diesel engine may provide useful engine braking to reduce or maintain vehicle speed when driver demand torque is low. The four stroke engine provides engine braking torque (e.g., a torque that acts to slow vehicle powertrain or driveline rotation, which may be referred to as a negative torque) when exhaust manifold pressure is increased to a greater pressure than engine intake manifold pressure, thereby creating a positive pressure change in pressure across the engine (e.g., between the cylinder intake valves and exhaust valves). The positive pressure across the engine increases engine pumping work to provide engine braking. However, a two stroke engine requires intake manifold pressure to be greater than exhaust manifold pressure to ensure air flow through the engine. Further, engine pumping work of a two stroke engine is not affected by boosting a two-stroke engine. Therefore, engine braking from engine pumping work of a two stroke engine is not increased or decreased when the two stroke engine is boosted. Yet, engine braking may be desirable to control vehicle speed whether the vehicle includes a four stroke or two stroke engine. Therefore, it may be desirable to provide a way of engine braking for a two stroke opposed piston engine.

The inventor herein has recognized the above-mentioned disadvantages and has developed a two stroke diesel engine braking method, comprising: completing cycles of all engine cylinders in two revolutions of an engine; and continuously adjusting engine braking torque of the engine without increasing engine pumping work of the engine via continuously adjusting a drive ratio of the mechanically driven supercharger in response to a request for engine braking.

By continuously adjusting flow through a mechanically driven supercharger, it may be possible to provide the technical result of providing engine braking via a two stroke engine without increasing engine pumping work. In particular, work performed by the mechanically driven supercharger may be adjusted via adjusting a drive ratio (e.g., a ratio of an actual total number of rotations of an input shaft of a supercharger compressor to an actual total number of rotations of an output shaft of the supercharger compressor. And, since the mechanically driven supercharger is part of the engine and coupled to the engine crankshaft, engine braking may be increased or decreased via adjusting the drive ratio of the mechanically driven supercharger. The drive ratio of the mechanically driven supercharger may be adjusted via a hydraulic actuator responsive to desired engine braking torque. In addition, an exhaust valve may be closed to further increase engine braking torque if engine braking torque is less than desired engine braking torque and desired engine braking torque may not be achieve via adjusting the supercharger drive ratio alone.

The present description may provide several advantages. Specifically, the approach may allow a two stroke diesel engine to supply engine braking. Further, the amount or level of engine braking may be adjusted proportionately in response to an engine braking request. Further still, the approach may be realized with more than a single hardware configuration. Additionally, by not increasing engine pumping work while performing engine braking, it may be possible to more precisely control engine braking since changes in engine pumping work may not have to be determined to control engine braking.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
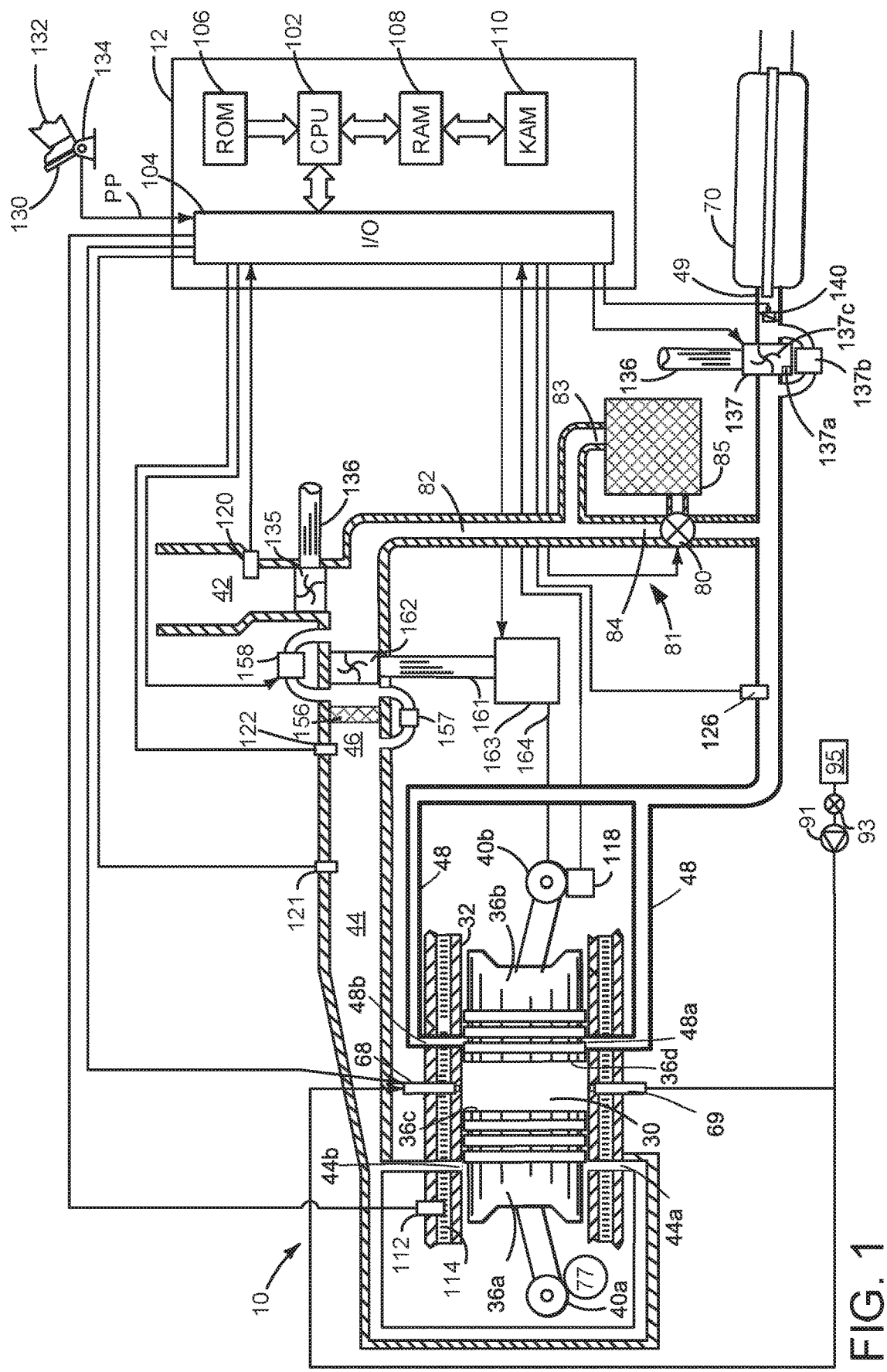
FIG. 1 shows a schematic depiction of an engine.
Figure 2A:
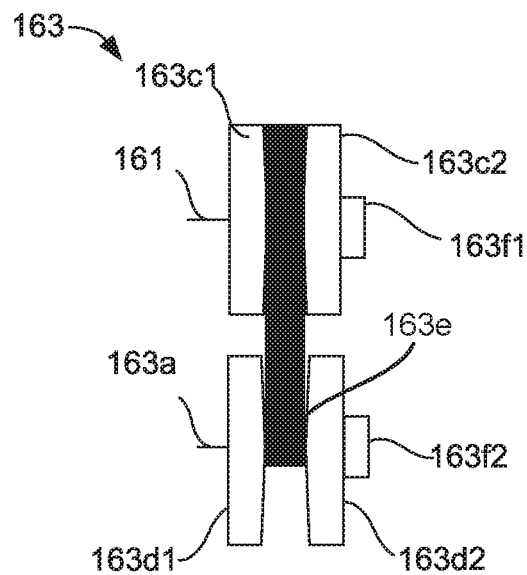
FIGS. 2A-2C show example adjustable supercharger drive ratio changing devices.
Figure 2B:
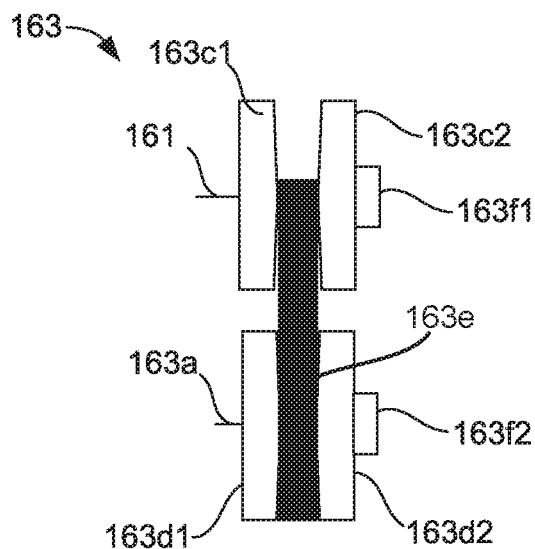
Figure 2C:
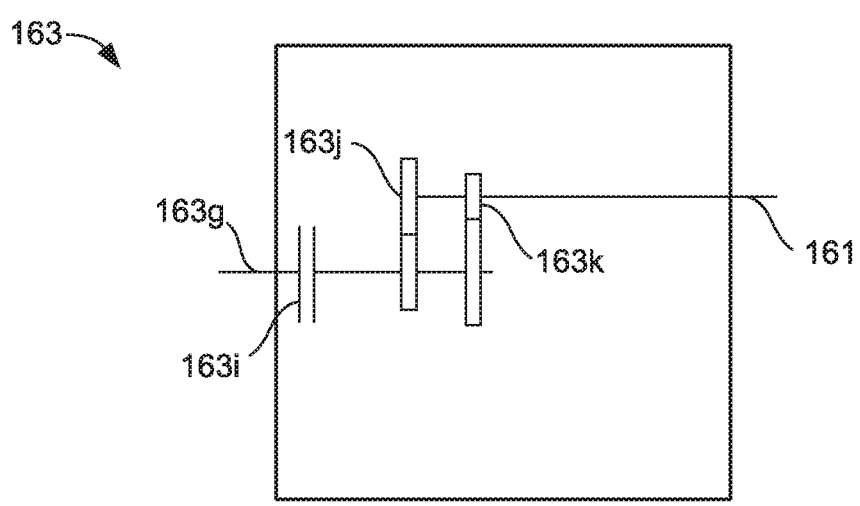
Figure 3:
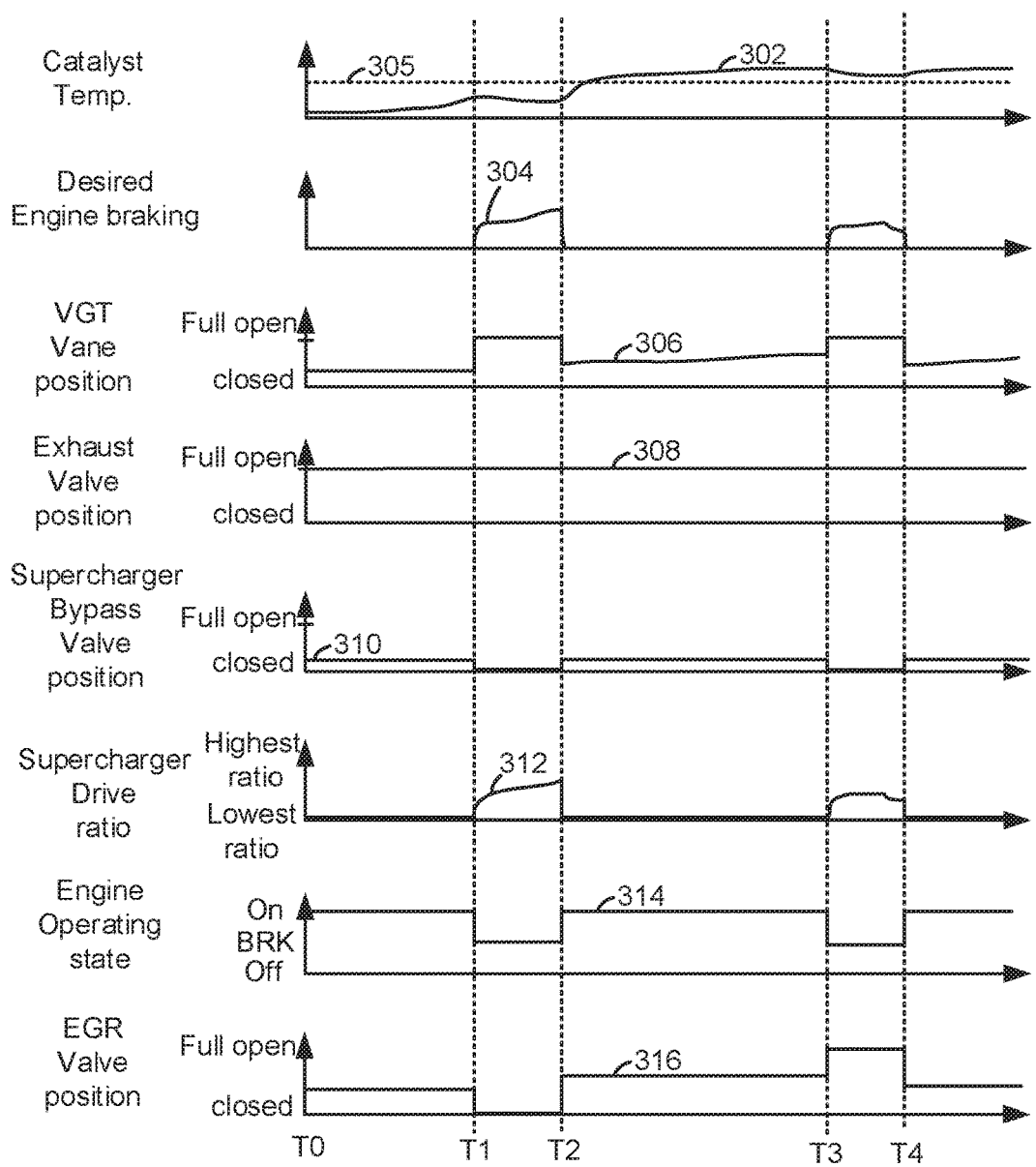
FIGS. 3 and 4 show example prophetic engine braking sequences for the engine shown in FIG. 1.
Figure 4:
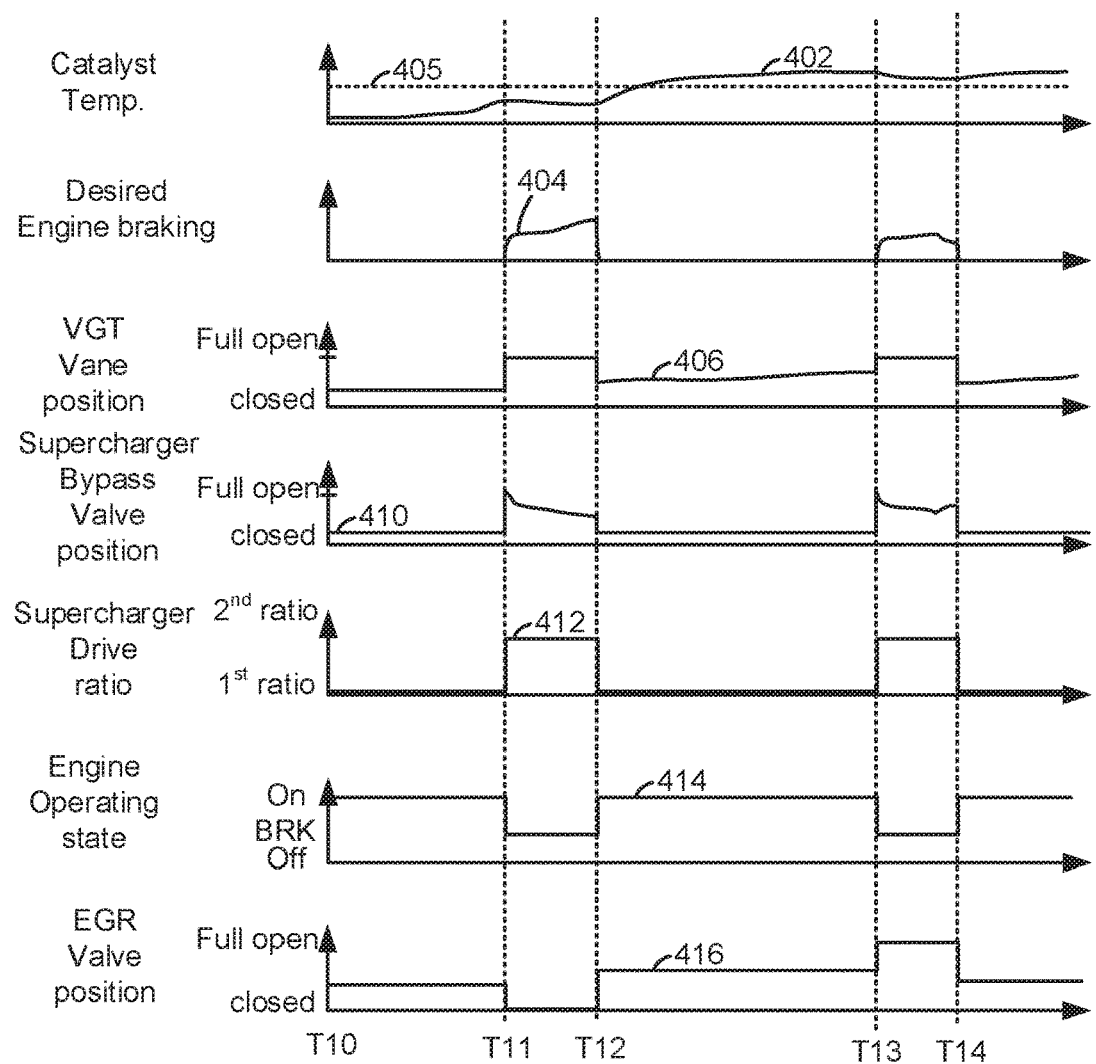
Figure 5:
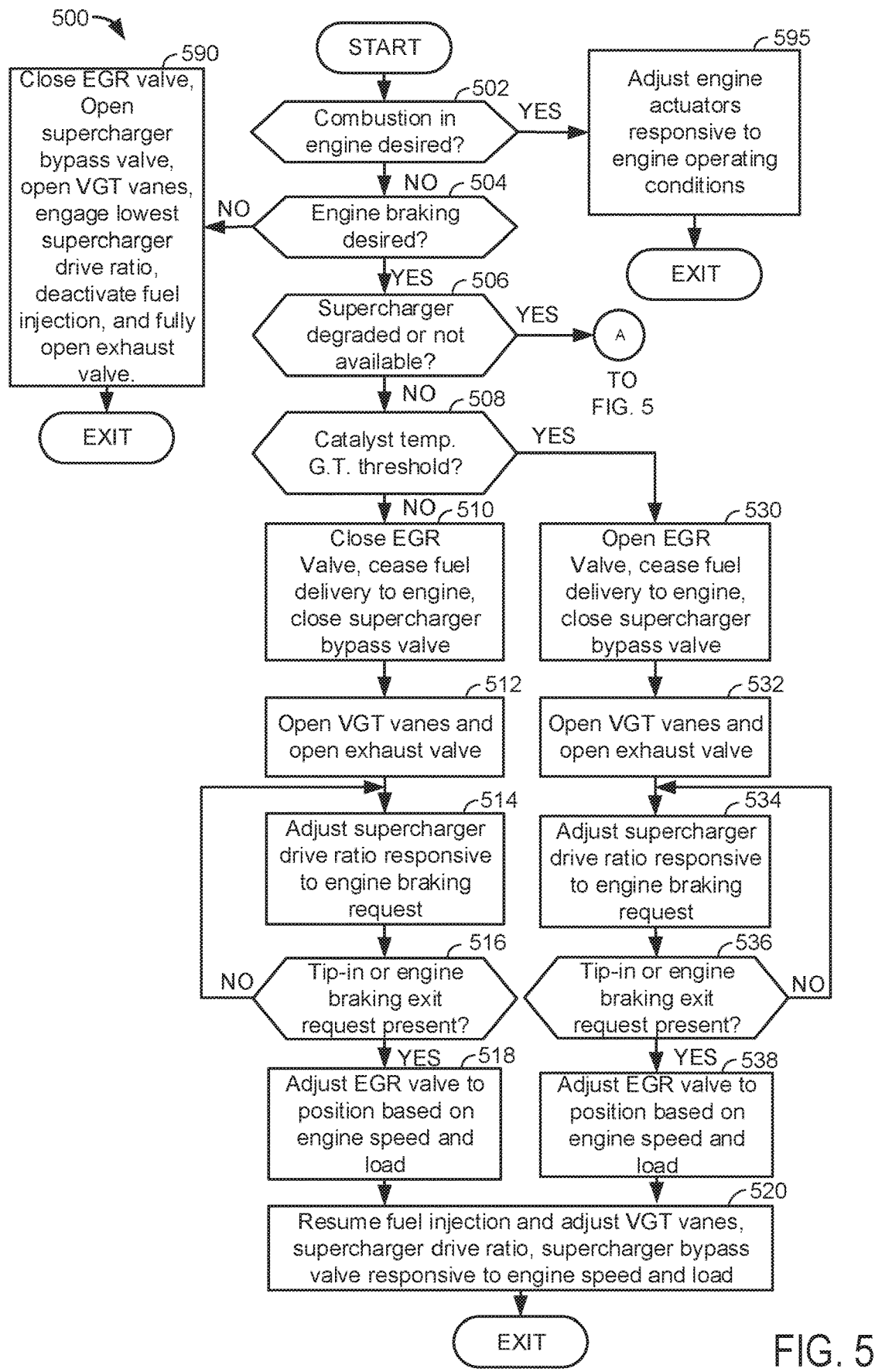
FIGS. 5 and 6 show an example method for providing engine braking via the engine of FIG. 1.
Figure 6:
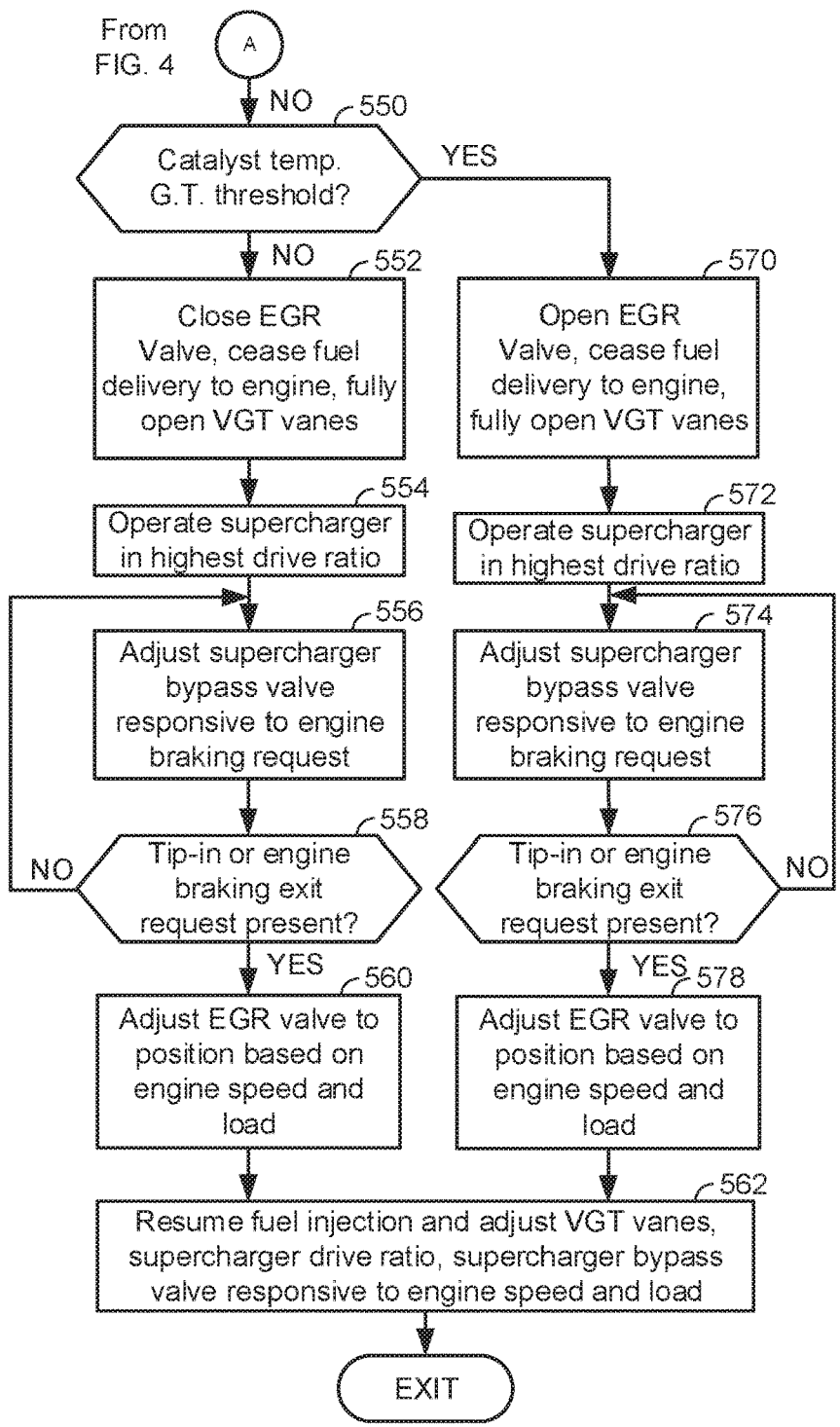

The present description is related to providing engine braking via a two stroke diesel engine. FIG. 1 shows one example of a boosted two stroke diesel engine that includes a mechanically driven supercharger and a turbocharger. FIGS. 2A-2C show example supercharger drive ratio changing devices. FIGS. 3 and 4 show two different engine braking sequences for the engine shown in FIGS. 1-2C. FIGS. 5 and 6 show a method for providing engine braking for the engine shown in FIG. 1.

Referring to FIG. 1, opposed piston two stroke internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes cylinder 30 and cylinder walls 32 with pistons 36a and 36b positioned therein and connected to crankshafts 40a and 40b respectively. Crankshafts 40a and 40b may be coupled together via chains or gears. Crankshafts 40a and 40b may be rotated by electric machine 77 (e.g., a starter motor) to crank engine 10. Cylinder 30 is shown communicating with intake manifold 44 and exhaust manifold 48 via intake ports 44a and 44b and exhaust ports 48a and 48b.

Fuel injectors 68 and 69 are shown positioned in cylinder walls 32 and they may inject fuel directly into cylinder 30, which is known to those skilled in the art as direct injection. Fuel is delivered to fuel injectors 68 and 69 by a fuel system including a fuel tank 95, fuel pump 91, fuel pump control valve 93, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with mechanically driven supercharger compressor 162, which draws air from downstream of turbocharger compressor 135. Supercharger compressor 162 is driven via crankshaft 40b, shaft 161, and supercharger drive ratio changing device 163, which may be coupled to crankshaft 40b via mechanism 164 (e.g., gears, a chain, or a belt). Supercharger drive ratio changing device 163 changes speed of supercharger compressor 162 relative to speed of crankshaft 40b. Supercharger compressor speed may be adjusted as discussed in further detail in the description of FIGS. 2A-2C.

Supercharger compressor bypass valve 158 may be selectively opened to reduce air pressure in intake manifold 44 and return air and/or exhaust gas to upstream of supercharger compressor 162 in a direction of air flow into the engine (e.g., from air intake 14 to cylinder inlet ports 44a and 44b). In some examples, a charge air cooler 156 may be provided downstream of supercharger compressor 162 to cool the air charge entering cylinder 30. Air charge cooler bypass valve 157 may be selectively opened to bypass charge air cooler 156.

Turbocharger compressor 135 draws air from air intake 42 and supplies the air to mechanically driven supercharger compressor 156. Exhaust gases spin turbocharger variable geometry turbine 137 which is coupled to turbocharger compressor 135 via shaft 136. A positon of vane actuator 137a may be adjusted via controller 12 to increase or decrease rotational speed of turbine 137. In alternative examples, a waste gate 137b may replace or be used in addition to vane actuator 137a. Vane actuator 137a adjusts a position of variable geometry turbine vanes 137c. Exhaust gases can pass through turbine 137 supplying little energy to rotate turbine 137 when vanes 137c are in an open position. Exhaust gases can pass through turbine 137 and impart increased force on turbine 137 when vanes 137c are in a closed position. Alternatively, wastegate 137b or a bypass valve allows exhaust gases to flow around turbine 137 so as to reduce the amount of energy supplied to the turbine.

Exhaust gases may be recirculated to cylinder 30 via exhaust gas recirculation (EGR) system 81. EGR system may include EGR cooler 85, EGR valve 80, EGR passage 82, EGR cooler bypass 84, and cooled EGR passage 83. Exhaust gases may flow from exhaust manifold 48 to the engine air intake between supercharger compressor 162 and turbocharger compressor 135. EGR may flow to the engine air intake when pressure in exhaust manifold 48 is greater than pressure between turbocharger compressor 135 and supercharger compressor 162. EGR may flow through EGR cooler 85 to reduce engine exhaust gas temperatures. EGR may bypass EGR cooler 85 when engine exhaust temperatures are low.

Fuel may be injected to cylinder 30 when pistons 36a and 36b are approaching each other after piston 36a covers intake ports 44a and 44b. The fuel may then be combusted with air in cylinder 30 when piston 36 is near top-dead-center compression stroke. The fuel and air may ignite via compression ignition. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

Engine 10 does not include glow plugs or spark plugs since it is a compression ignition engine and since it does not include a cylinder head. Further, engine 10 does not include poppet valves to regulate air and exhaust flow into and out of cylinder 30.

Exhaust valve 140 (e.g., a butterfly valve) is shown positioned in exhaust passage 49 downstream of turbine 137a and upstream of emissions device 70. Exhaust valve 140 may be opened and closed to control pressure in exhaust manifold 48 and flow through exhaust manifold 48. Closing exhaust valve 140 restricts flow through exhaust valve 140 and may increase pressure in exhaust manifold 48 and decrease flow through exhaust manifold 48. Opening exhaust valve 140 may improve flow through exhaust valve 140 and reduce pressure in exhaust manifold 48 and increase flow through exhaust manifold 48.

Emissions device 70 can include an oxidation catalyst and particulate filter, in one example. In another example, multiple emission control devices, each with multiple bricks, can be used. Emissions device 70 can include an oxidation catalyst in one example. In other examples, the emissions device may include a lean NOx trap or a selective catalytic reduction (SCR), and/or a diesel particulate filter (DPF).

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44; exhaust gas oxygen concentration from oxygen sensor 126; an engine position sensor from a Hall effect sensor 118 sensing crankshaft 40b position; and a measurement of air mass entering the engine from sensor 120 (e.g., a hot wire air flow meter). Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a two stroke cycle: the cycle includes a first stroke where the intake piston 36a travels toward exhaust piston 36b and exhaust piston 36b travels toward intake piston 36a. In the second stroke, intake piston 36a travels away from exhaust piston 36b and exhaust piston 36b travels away from intake piston 36a. Intake piston 36a controls flow through intake ports 44a and 44b. Exhaust piston 36b controls flow through exhaust ports 48a and 48b. In this example, exhaust piston 36b leads intake piston 36a by reaching a top dead center position (e.g., a maximum distance exhaust piston 36b is from crankshaft 40b) a few crankshaft degrees (e.g., depending on configuration, the difference may range between 0 and 20 crankshaft degrees) before intake piston 36 a reaches its top dead center position (e.g., maximum distance intake piston 36a is from crankshaft 40a). Thus, exhaust piston motion is offset from intake piston motion by a few crankshaft degrees.

During the first stroke, generally, the intake piston 36a and exhaust piston 36b are moving toward each other to compress air that has entered cylinder 30. The stroke begins at bottom dead center (BDC) for intake piston 36a (intake piston 36a is closest distance to crankshaft 40a) and it ends at top dead center for intake piston 36a (intake piston 36a is at its farthest distance from crankshaft 40a). As previously mentioned, exhaust piston 36b leads intake piston 36a by a few degrees so that it is already traveling toward its TDC position when intake piston is at BDC. Further, exhaust piston 36b reaches its TDC position just before intake piston 36a reaches its TDC position. Exhaust piston 36b is located just after its TDC position when intake piston 36a reaches its TDC position. Cylinder volume is smallest when intake piston 36a and exhaust piston 36b are near their respective TDC positions. Air and fuel are compressed in cylinder 30 as intake piston 36a and exhaust piston 36b advance toward their respective TDC positions. Intake ports 44a and 44b are open and pressurized air flows into cylinder 30 when intake pistons 36a and exhaust piston 36b are near their respective BDC positions. Exhaust ports 48a and 48b are also open when intake piston 36a and exhaust piston 36b are near BDC. Supercharger compressor 162 and turbocharger compressor 135 provide pressurized air to intake manifold 44 which may flow into cylinder 30 when intake ports 44a and 44b are open. As intake piston 36a and exhaust piston 36b move toward their respective TDC positions, exhaust ports 48a and 48b close. The crankshaft continues to rotate and after a predetermined actual total number of crankshaft degrees, intake ports 44a and 44b are closed to prevent additional air from entering cylinder 36. Thus, the exhaust ports are opened before the intake ports and the exhaust ports remain open for nearly the entire duration that the intake ports are open. Fuel is injected to cylinder 30 after exhaust ports 44a and 44b close, then the fuel and air mixture is ignited when intake piston 36a and exhaust piston 36b are near their respective TDC locations. The fuel and air mixture is ignited by compression ignition and not via a spark plug or energy from a glow plug. Fuel may be injected to cylinder 30 via a plurality of injections including pilot injections, main injections, and post injections.

During the second stroke, generally, the intake piston 36a and exhaust piston 36b are moving apart from each other after combustion takes place in cylinder 30. The second stroke begins at TDC of intake piston 36a and it ends at BDC of intake piston 36a. Intake piston 36a and exhaust piston 36b approach their respective BDC positions near where volume of cylinder 30 is greatest. Gases expanding in cylinder 30 push intake piston 36a and exhaust piston 36b apart toward their respective BDC positions. Exhaust piston 36b passes exhaust ports 48a and 48b as it travels toward its BDC. Exhaust ports 48a and 48b are uncovered when top of exhaust piston 36d passes exhaust ports 48a and 48b while exhaust piston 36b is traveling toward crankshaft 40b. Exhaust gases exit cylinder 30 after exhaust piston 36b passes exhaust ports 48a and 48b while traveling toward bottom dead center. Intake pistons 36a and exhaust piston 36b travel further toward their respective bottom dead center positions, and after a predetermined actual total number of crankshaft degrees, intake piston 36a uncovers intake ports 44a and 44b. Intake ports 44a and 44b are uncovered when top of intake piston 36c passes intake ports 44a and 44b while intake piston 36a is traveling toward crankshaft 40a. Fresh air enters cylinder 30 via intake ports 44a and 44b when intake ports 44a and 44b are uncovered. Intake piston 36a and exhaust piston 36b continue to travel toward their respective BDC locations. After intake piston reaches BDC the cylinder cycle repeats.

Thus, the engine cycle is comprised of two strokes and the engine cycle is one engine revolution. Other engine cylinders operate in a similar way but these other cylinders may combust air and fuel out of phase with the cylinder shown. For example, top dead center compression stroke of one engine cylinder may be at zero crankshaft degrees while top dead center of another cylinder may be at one hundred and eighty crankshaft degrees.

Referring now to FIG. 2A, a first example mechanically driven supercharger ratio changing device 163 is shown. This mechanically driven supercharger ratio changing device includes an input shaft 163a that is coupled to mechanism 164 of FIG. 1 and output shaft 161 that is coupled to compressor 162. Thus, the first pulley comprised of first pulley half 163d1 and second pulley half 163d2 is a drive pulley, and the second pulley comprised of first pulley half 163c1 and second pulley half 163c2 is a driven pulley. The first pulley is arranged along shaft 163a. Hydraulic actuator 163f2 may compress or decompress first pulley half 163d1 and second pulley half 163d2 to change a radius loop of belt 163e, thereby adjusting a ratio of the mechanically driven supercharger. Similarly, the second pulley is arranged along shaft 161. Hydraulic actuator 163f1 may compress or decompress first pulley half 163c1 and second pulley half 163c2 to change a radius loop of belt 163e, thereby adjusting a ratio of the mechanically driven supercharger. The radius loops of belt 163e wrapping around shaft 161 and shaft 163a may be adjusted simultaneously to continuously adjust the ratio of the mechanically driven supercharger. FIG. 2A shows mechanically driven supercharger ratio changing device 163 in a lower ratio position while FIG. 2B shows mechanically driven supercharger ratio changing device 163 in a higher ratio position. Mechanically driven supercharger ratio changing device 163 rotates compressor 162 at a lower speed when it is operating in a lower ratio. Mechanically driven supercharger ratio changing device 163 rotates compressor 162 at a higher speed when it is operating in a higher ratio. Because the radius of belt 163e may be adjusted, the ratio of mechanically driven supercharger ratio changing device 163 may be continuously adjusted such that there is no step ratio change. Instead, the ratio change may be performed continuously and without interruption or steps in the ratio change.

Referring now to FIG. 2C, a second example mechanically driven supercharger ratio changing device 163 is shown. Mechanically driven supercharger ratio changing device 163 includes an input shaft 163g that is coupled to mechanism 164 of FIG. 1 and output shaft 161 to drive compressor 162 shown in FIG. 1. Mechanically driven supercharger ratio changing device 163 also includes a clutch 163i that allows shifting between a lower gear 163j and a higher gear 163k. Lower gear 163j rotates output shaft 161 at a lower speed than higher gear 163k rotates output shaft 161 for a same input shaft speed. Thus, in this example, mechanically driven supercharger ratio changing device 163 includes two gear ratios and it is configured as a step ratio gear box. In other examples, mechanically driven supercharger ratio changing device 163 may include more than two gear ratios. By switching gear ratios, mechanically driven supercharger ratio changing device 163 may rotate compressor 162 at a lower speed or a higher speed responsive to vehicle operating conditions.

Thus, the system of FIGS. 1-2C provides for an engine system, comprising: an opposed piston two stroke diesel engine including fuel injectors; a supercharger coupled to the opposed piston two stroke diesel engine, the supercharger having continuously variable drive ratios; a turbocharger coupled to the opposed piston two stroke diesel engine; and a controller including executable instructions stored in non-transitory memory to adjust engine braking via continuously adjusting supercharger flow without increasing engine pumping work in response to a request for engine braking. The engine system further comprises additional instructions to adjust supercharger flow via a supercharger drive ratio changing device. The engine system further comprises additional instructions to adjust supercharger flow via a position of a supercharger bypass valve in response to the request for engine braking. The engine system further comprises additional instructions to adjust a position of an exhaust gas recirculation valve in response to the request for engine braking. The engine system includes where adjusting the position of the exhaust gas recirculation valve includes closing the exhaust gas recirculation valve. The engine system includes where adjusting the position of the exhaust gas recirculation valve includes opening the exhaust gas recirculation valve.

Referring now to FIG. 3, a first example engine braking sequence according to method 500 is shown. The engine braking sequence of FIG. 3 may be for the engine and system shown in FIG. 1. The vertical lines at times T1-T4 represent times of interest in the sequence. The plots are aligned in time and occur at the same time. In this example engine braking sequence, work is performed on air within the engine via a supercharger compressor. Engine pumping work is not increased during engine braking in this example sequence as compared to when the compressor performs less work on air entering the engine at the same engine speed. In other words, engine pumping work is constant for a particular engine speed even if compressor work is increased or decreased to alter engine braking. Thus, the supercharger work is adjusted to change the engine braking amount responsive to a desired amount of engine braking. Further, although not shown, a transmission coupled to the engine may be downshifted to increase engine braking.

The first plot from the top of FIG. 3 is a plot of temperature of a catalyst (e.g., 70 of FIG. 1) in an exhaust system of an engine versus time. Trace 302 represents temperature of the catalyst. The vertical axis represents temperature of the catalyst and temperature increases in the direction of the vertical axis arrow. The horizontal axis represents time and time increases from the left side of the figure to the right side of the figure. Line 305 represents a threshold catalyst temperature below which the method of FIGS. 5 and 6 provides a first engine braking procedure and above which the method of FIGS. 5 and 6 provides a second braking procedure.

The second plot from the top of FIG. 3 is a plot of desired engine braking torque versus time. Trace 304 represents desired engine braking torque. The vertical axis represents desired engine braking torque and desired engine braking torque increases in the direction of the vertical axis arrow. The horizontal axis represents time and time increases from the left side of the figure to the right side of the figure. The desired engine braking torque may be a predetermined braking torque that is a function of vehicle speed and driver demand torque. For example, driver demand torque and vehicle speed may be variables that are input to the function and the function outputs empirically determined amounts of engine braking torque in response to the driver demand torque and vehicle speed. The driver demand torque may be determined from accelerator pedal position. Thus, if driver demand torque is zero and vehicle speed is 60 KPH, a desired engine braking torque of 25 N-m may be output from the function so that the vehicle decelerates at a desired rate when driver demand is zero. In addition, the desired engine braking torque may be increased in response to the vehicle accelerating when driver demand torque is zero so that additional engine braking may be provided when a vehicle is traveling on a downhill grade.

The third plot from the top of FIG. 3 is a plot of variable geometry turbocharger (VGT) vane position versus time. Trace 306 represents VGT vane position. The vertical axis represents VGT vane position and the vanes open in the direction of the vertical axis arrow. The horizontal axis represents time and time increases from the left side of the figure to the right side of the figure.

The fourth plot from the top of FIG. 3 is a plot of exhaust valve position versus time. Trace 308 represents exhaust valve position. The vertical axis represents exhaust valve position and the exhaust valve opens in the direction of the vertical axis arrow. The horizontal axis represents time and time increases from the left side of the figure to the right side of the figure.

The fifth plot from the top of FIG. 3 is a plot of mechanically driven supercharger bypass valve position versus time. Trace 310 represents mechanically driven supercharger bypass valve position. The vertical axis represents mechanically driven supercharger bypass valve position and the supercharger bypass valve opens in the direction of the vertical axis arrow. The horizontal axis represents time and time increases from the left side of the figure to the right side of the figure.

The sixth plot from the top of FIG. 3 is a plot of supercharger drive ratio versus time. The vertical axis represents supercharger drive ratio. Trace 312 represents supercharger drive ratio. The supercharger drive ratio may be continuously varied between a lowest ratio and a highest ratio as indicated along the vertical axis. The supercharger compressor rotates at a first speed that is greater than crankshaft speed when the lowest supercharger drive ratio is engaged, the supercharger compressor rotates at a second speed that is greater than crankshaft speed when the highest drive ratio is engaged, the first speed lower than the second speed. The horizontal axis represents time and time increases from the left side of the figure to the right side of the figure.

The seventh plot from the top of FIG. 3 is a plot of engine operating state versus time. The vertical axis represents engine operating state and the engine operating states of off (no engine rotation), braking (Brk) (engine is rotated, not combusting air and fuel, and providing a negative torque to a vehicle driveline), and on (engine is rotating under its own torque output and combusting air and fuel). Trace 314 represents engine operating state. The horizontal axis represents time and time increases from the left side of the figure to the right side of the figure.

The eighth plot from the top of FIG. 3 is a plot of EGR valve position versus time. The vertical axis represents EGR valve position. Trace 316 represents EGR valve position and the EGR valve is fully open when the EGR trace 316 is near the vertical axis arrow. The EGR valve is fully closed when EGR trace 316 is near the horizontal axis. The horizontal axis represents time and time increases from the left side of the figure to the right side of the figure.

At time T0, the catalyst temperature is low and engine is operating and combusting air and fuel. The amount of desired engine braking is zero and VGT vanes are partially open to control turbocharger speed. The exhaust valve is fully open and the supercharger bypass valve is partially open. The supercharger drive ratio is a lowest ratio and the EGR valve is partially open. Such conditions may be present when a vehicle is traveling on a road and driver demand torque is greater than zero.

At time T1, engine braking is requested and desired engine braking begins to increase when the brake pedal is applied (not shown). Engine braking may be requested in response to driver demand torque being zero and vehicle speed being greater than a threshold (not shown). The VGT vanes are fully opened and the exhaust valve is also fully opened in response to engine braking being requested. Opening the VGT vanes may reduce exhaust pressure to allow the mechanically driven supercharger to have the dominate effect on engine braking torque via adjusting air flow through the mechanically driven supercharger without changing engine pumping work as compared to if the compressor performed less work on air entering the engine at the same engine speed. The supercharger bypass valve is also fully closed and the supercharger drive ratio is gradually increased in response to the engine braking being requested.

Increasing the mechanical supercharger drive ratio increases work performed by the mechanically driven supercharger and engine braking torque. Not bypassing the mechanical supercharger increases work performed on air and the engine braking amount and air temperature is increased to reduce exhaust cooling. The EGR valve is also fully closed in response to the engine braking request and catalyst temperature being less than a threshold. By closing the EGR valve when catalyst temperature is less than threshold 205, exhaust gas may be trapped in the EGR passages so that if the driver demand torque increases and engine braking is not requested, the EGR valve may be opened to reduce engine NOx emissions while catalyst efficiency may be low.

Between time T1 and time T2, the catalyst temperature decreases a small amount and it remains below threshold 305. The desired engine braking is also increased responsive to vehicle speed (not shown) and the VGT vanes remain fully open. The exhaust valve also remains fully open and the supercharger bypass valve remains fully closed while the supercharger drive ratio is continuously increased as the desired engine braking torque is increased. However, if the supercharger drive ratio is adjusted to a lowest ratio and engine braking is greater than is desired, the exhaust valve may be partially closed to reduce engine braking via reducing compressor work. Likewise, the supercharger bypass valve may be partially opened to reduce compressor work. The EGR valve remains fully closed.

At time T2, the engine exits engine braking and the engine is activated to enter an "on" state in response to an increase in driver demand torque (not shown). The desired engine braking torque is reduced to zero and the exhaust valve remains fully opened in response to engine braking not being requested. The supercharger bypass valve is partially opened and the supercharger drive ratio is continuously reduced to a lower ratio in response to engine braking not being requested. The EGR valve is also partially opened to allow exhaust gas to enter the cylinder so that NOx may be reduced while the catalyst temperature is low in response to engine braking not being requested and an applied accelerator (e.g., a tip-in is a condition when a vehicle driver increases an amount an accelerator pedal is applied).

Between time T2 and time T3, the engine remains activated combusting air and fuel such that engine braking is not requested and the desired engine braking amount is zero. The VGT vane position is adjusted responsive to engine speed and driver demand torque (not shown) and the exhaust valve is held fully open. The supercharger bypass valve is partially open and the supercharger drive ratio is a lower ratio. The EGR valve position is adjusted responsive to engine speed and driver demand (not shown).

At time T3, the driver releases the accelerator pedal (not shown) and engine braking is requested as indicated by the engine state transitioning to engine braking. The desired engine braking increases in response to the engine entering engine braking mode and VGT vanes are fully opened. The exhaust valve remains fully open and the supercharger bypass valve is also fully closed to increase work performed via the mechanically driven supercharger, thereby increasing engine braking torque. The supercharger drive ratio is continuously increased to increase work performed via the mechanically driven supercharger. The supercharger drive ratio is adjusted proportionately in response to the desired engine braking amount. The EGR valve is also opened fully to promote air flow through the engine instead of the exhaust system. By opening the EGR valve in response to catalyst temperature being greater than threshold 205, catalyst temperature may remain elevated while increasing work performed via the mechanically driven compressor. Thus, most air entering the engine recirculates through the engine instead of out the tailpipe.

Between time T3 and time T4, the catalyst temperature remains elevated and the engine braking request varies with vehicle operating conditions. The desired engine braking amount is varied with driver demand torque and vehicle speed (not shown). The exhaust valve position remains fully open. The supercharger bypass valve is fully closed to increase work performed by the mechanically driven compressor, thereby increasing engine braking torque. The supercharger drive ratio is continuously adjusted in proportion to the desired engine braking torque. The EGR valve remains fully open.

At time T4, the engine exits engine braking and the engine is activated to enter an "on" state in response to an increase in driver demand torque (not shown). The desired engine braking torque is reduced to zero and the exhaust valve remains fully opened in response to engine braking not being requested. The supercharger bypass valve is partially opened and the supercharger drive ratio is reduced proportionately with the reduction of desired engine braking torque. The EGR valve is also partially closed to allow exhaust gas to enter the cylinder.

In this way, engine braking may be provided for a two stroke engine having cylinder exhaust ports that are open an entire duration while the cylinder's intake ports are open. The engine braking is provided by adjusting a ratio of the mechanically driven supercharger. By adjusting the ratio, work performed on air by the supercharger may be adjusted to respond to desired engine braking torque. Further, during cold catalyst conditions an EGR valve may be closed when engine braking begins so that NOx control may be improved when exiting engine braking. If the catalyst is warm, the EGR valve may be fully opened when engine braking begins so that less fresh air may be pumped to the catalyst, which may allow the catalyst to stay above light off temperature.

Referring now to FIG. 4, a second example engine braking sequence according to method 500 is shown. The engine braking sequence of FIG. 4 may be for the engine and system shown in FIG. 1. The vertical lines at times T10-T14 represent times of interest in the sequence. The plots are aligned in time and occur at the same time. In this example engine braking sequence, work is performed on air within the engine via a supercharger compressor via controlling a supercharger bypass valve position. The sequence of FIG. 4 may be provided when exhaust valves and/or continuously variable supercharger drive ratios are not available or present. Engine pumping work is not increased during engine braking in this example sequence as compared to if the compressor performed less work on air entering the engine at the same engine speed.

The first plot from the top of FIG. 4 is a plot of temperature of a catalyst (e.g., 70 of FIG. 1) in an exhaust system of an engine versus time. Trace 402 represents temperature of the catalyst. The vertical axis represents temperature of the catalyst and temperature increases in the direction of the vertical axis arrow. The horizontal axis represents time and time increases from the left side of the figure to the right side of the figure. Line 405 represents a threshold catalyst temperature below which the method of FIG. 5 provides a third engine braking procedure and above which the method of FIG. 5 provides a fourth braking procedure.

The second plot from the top of FIG. 4 is a plot of desired engine braking torque versus time. Trace 404 represents desired engine braking torque. The vertical axis represents desired engine braking torque and desired engine braking torque increases in the direction of the vertical axis arrow. The horizontal axis represents time and time increases from the left side of the figure to the right side of the figure. The desired engine braking torque may be a predetermined braking torque that is a function of vehicle speed and driver demand torque. For example, driver demand torque and vehicle speed may be variables that are input to the function and the function outputs empirically determined amounts of engine braking torque in response to the driver demand torque and vehicle speed. The driver demand torque may be determined from accelerator pedal position. Thus, if driver demand torque is zero and vehicle speed is 60 KPH, a desired engine braking torque of 25 N-m may be output from the function so that the vehicle decelerates at a desired rate when driver demand is zero. In addition, the desired engine braking torque may be increased in response to the vehicle accelerating when driver demand torque is zero so that additional engine braking may be provided when a vehicle is traveling on a downhill grade.

The third plot from the top of FIG. 4 is a plot of variable geometry turbocharger (VGT) vane position versus time. Trace 406 represents VGT vane position. The vertical axis represents VGT vane position and the vanes open in the direction of the vertical axis arrow. The horizontal axis represents time and time increases from the left side of the figure to the right side of the figure.

The fourth plot from the top of FIG. 4 is a plot of mechanically driven supercharger bypass valve position versus time. Trace 410 represents mechanically driven supercharger bypass valve position. The vertical axis represents mechanically driven supercharger bypass valve position and the supercharger bypass valve opens in the direction of the vertical axis arrow. The horizontal axis represents time and time increases from the left side of the figure to the right side of the figure.

The fifth plot from the top of FIG. 4 is a plot of supercharger drive ratio versus time. The vertical axis represents supercharger drive ratio. Trace 412 represents supercharger drive ratio. The supercharger drive ratios are listed along the vertical axis. The second supercharger drive ratio is a higher drive ratio than the first supercharger drive ratio and the supercharger compressor rotates at a higher speed relative to engine crankshaft speed when the second supercharger drive ratio is engaged. The supercharger compressor rotates at a lower speed relative to engine crankshaft speed when the first supercharger drive ratio is engaged. Thus, by engaging the second supercharger drive ratio, the supercharger compressor rotates at a higher speed than if the first supercharger drive ratio were engaged. The horizontal axis represents time and time increases from the left side of the figure to the right side of the figure.

The sixth plot from the top of FIG. 4 is a plot of engine operating state versus time. The vertical axis represents engine operating state and the engine operating states of off (no engine rotation), braking (Brk) (engine is rotated, not combusting air and fuel, and providing a negative torque to a vehicle driveline), and on (engine is rotating under its own torque output and combusting air and fuel). Trace 414 represents engine operating state. The horizontal axis represents time and time increases from the left side of the figure to the right side of the figure.

The seventh plot from the top of FIG. 4 is a plot of EGR valve position versus time. The vertical axis represents EGR valve position. Trace 416 represents EGR valve position and the EGR valve is fully open when the EGR trace 416 is near the vertical axis arrow. The EGR valve is fully closed when EGR trace 416 is near the horizontal axis. The horizontal axis represents time and time increases from the left side of the figure to the right side of the figure.

At time T10, the catalyst temperature is low and engine is operating and combusting air and fuel. The amount of desired engine braking is zero and VGT vanes are partially open to control turbocharger speed. The supercharger bypass valve is partially open. The supercharger drive ratio is a first ratio (e.g., a lower ratio) and the EGR valve is partially open. Such conditions may be present when a vehicle is traveling on a road and driver demand torque is greater than zero.

At time T11, engine braking is requested and desired engine braking begins to increase while the brake pedal is applied (not shown). Engine braking may be requested in response to driver demand torque being zero and vehicle speed being greater than a threshold (not shown). The VGT vanes are fully opened to increase engine braking in response to engine braking being requested. The supercharger bypass valve is adjusted in proportion to the desired engine braking amount. Adjusting the supercharger bypass valve position changes the amount of work performed on air by the mechanically driven supercharger without changing engine pumping work as compared to if the compressor performed less work on air entering the engine at the same engine speed. The EGR valve is also fully closed in response to the engine braking request and catalyst temperature being less than a threshold. The EGR is immediately closed in response to ensure that fresh air does not enter the EGR system passages. By closing the EGR valve when catalyst temperature is less than threshold 405, exhaust gas may be trapped in the EGR passages so that if the driver demand torque increases and engine braking is not requested, the EGR valve may be opened to reduce engine NOx emissions while catalyst efficiency may be low. The supercharger drive ratio is increased from the first ratio to a second ratio. Increasing the mechanical supercharger drive ratio increases work performed by the mechanically driven supercharger and engine braking.

Between time T11 and time T12, the catalyst temperature decreases and it remains below threshold 305. The desired engine braking is also increased responsive to vehicle speed (not shown) and the supercharger bypass valve position is adjusted to provide the desired engine braking amount. The VGT vanes remain fully open and the supercharger drive ratio remains the second drive ratio. The EGR valve remains closed.

At time T12, the engine exits engine braking and the engine is activated to enter an "on" state in response to an increase in driver demand torque (not shown). The desired engine braking torque is reduced to zero and the supercharger bypass valve is adjusted to a position responsive to engine speed and driver demand torque. The VGT vanes are also adjusted responsive to engine speed and load. The supercharger drive ratio is reduced to a first ratio in response to engine braking not being requested. The EGR valve is also partially opened to allow exhaust gas to enter the cylinder so that NOx may be reduced while the catalyst temperature is low in response to engine braking not being requested and an applied accelerator (e.g., a tip-in is a condition when a vehicle driver increases an amount an accelerator pedal is applied).

Between time T12 and time T13, the engine remains activated combusting air and fuel such that engine braking is not requested and the desired engine braking amount is zero. The VGT vane position is adjusted responsive to engine speed and driver demand torque (not shown). The supercharger bypass valve is partially open and the supercharger drive ratio is a first ratio. The EGR valve position is adjusted responsive to engine speed and driver demand (not shown).

At time T13, the driver releases the accelerator pedal (not shown) and engine braking is requested as indicated by the engine state transitioning to engine braking. The desired engine braking increases in response to the engine entering engine braking mode. The supercharger bypass valve position is adjusted to provide the desired level of engine braking via adjusting net air flow into the engine. The VGT vanes are fully opened to reduce exhaust manifold backpressure. The supercharger drive ratio is also increased to increase work performed via the mechanically driven supercharger. The EGR valve is also opened fully to promote air flow recirculation within the engine instead of flowing air through the exhaust system. By opening the EGR valve in response to catalyst temperature being greater than threshold 405, catalyst temperature may remain elevated while increasing work performed via the mechanically driven compressor.

Between time T13 and time T14, the catalyst temperature decreases and the engine braking request varies with vehicle operating conditions. The desired engine braking amount is varied with driver demand torque and vehicle speed (not shown). The supercharger bypass valve position is adjusted to provide the desired engine braking torque amount. Adjusting the supercharger bypass valve position adjusts net air flow through the mechanically driven compressor and into the engine. The VGT vanes remain fully open. The supercharger drive ratio remains at the second level and the EGR valve remains fully open.

At time T14, the engine exits engine braking and the engine is activated to enter an "on" state in response to an increase in driver demand torque (not shown). The desired engine braking torque is reduced to zero and the supercharger bypass valve position is adjusted responsive to engine speed and driver demand torque (not shown). The VGT vane positions are also adjusted responsive the engine speed and load. The supercharger drive ratio is reduced to a first ratio in response to engine braking not being requested. The EGR valve is also partially closed to allow exhaust gas to enter the cylinder.

In this way, engine braking may be provided for a two stroke engine having cylinder exhaust ports that are open an entire duration while the cylinder's intake ports are open. The engine braking is provided by the mechanically driven supercharger and a position of a supercharger bypass valve that regulates net air flow through the mechanically driven supercharger. Further, during cold catalyst conditions an EGR valve may be closed when engine braking begins so that NOx control may be improved when exiting engine braking. If the catalyst is warm, the EGR valve may be fully opened when engine braking begins so that less fresh air may be pumped to the catalyst, which may allow the catalyst to stay above light off temperature.

Referring now to FIGS. 5 and 6, a method for providing adjustable engine braking for a two stroke diesel engine is shown. The method of FIGS. 5 and 6 may be stored as executable instructions in non-transitory memory in systems such as shown in FIG. 1. The method of FIGS. 5 and 6 may be incorporated into and may cooperate with the systems of FIG. 1. Further, at least portions of the method of FIGS. 5 and 6 may be incorporated as executable instructions stored in non-transitory memory while other portions of the method may be performed via a controller transforming operating states of devices and actuators in the physical world. The controller may employ engine actuators of the engine system to adjust engine operation, according to the methods described below.

At 502, method 500 judges if combustion in the two stroke diesel engine is desired. In one example, method 500 judges that vehicle operation is desired if a human or autonomous driver supplies input to a controller that indicates a desire for engine operation (e.g., inserting a key in a switch or depressing a pushbutton). If vehicle operation is desired, method 500 may judge that combustion is desired in the two stroke diesel engine responsive to accelerator pedal input and brake pedal input. If method 500 judges that combustion in the two stroke diesel engine is desired, the answer is yes and method 500 proceeds to 595. Otherwise, the answer is no and method 500 proceeds to 504. If combustion is not desired, the engine may continue to rotate after combustion ceases via the vehicle's kinetic energy supplying torque to the engine via vehicle wheels and the vehicle's driveline. If the engine continues to rotate without combustion being present, the engine continues opening an exhaust port of a cylinder for an entire duration an intake port of the cylinder is open and flowing air to the cylinder via a mechanically driven supercharger as the engine rotates. The mechanically driven supercharger continues to rotate and compress air using the vehicle's kinetic energy. Alternatively, engine rotation may be stopped when combustion ceases in the engine.

At 595, method 500 injects fuel to the engine and adjusts engine actuators responsive to vehicle operating conditions to provide combustion within the two stroke diesel engine. For example, method 500 may adjust a fuel injection amount, air flow through a mechanically driven compressor, exhaust gas recirculation (EGR) valve position, VGT vane position, and fuel injection timing responsive to driver demand torque, engine speed, and vehicle speed. Driver demand torque may be determined via referencing a function in controller memory via accelerator pedal position and vehicle speed. The accelerator pedal position and vehicle speed correspond to an empirically determined driver demand torque stored in the function. The function outputs the driver demand torque. Method 500 proceeds to exit after adjusting engine actuators.

At 504, method 500 judges if engine braking is desired. Method 500 may judge that engine braking is desired responsive to driver demand torque, vehicle speed, and brake pedal being applied. In particular, if driver demand torque is less than a threshold and vehicle speed is greater than a threshold while the brake pedal is applied, engine braking may be requested. Engine braking may reduce vehicle speed without having to apply vehicle brakes. For example, if driver demand torque is zero, the vehicle's kinetic energy may keep the vehicle moving and provide a positive torque to the vehicle's driveline or powertrain. However, the engine may apply a negative torque to the driveline to slow the vehicle and consume some of the vehicle's kinetic energy. The negative torque may be provided via a mechanically driven compressor performing work on air entering the engine at an engine speed without increasing engine pumping work as compared to if the compressor performed less work on air entering the engine at the same engine speed. The amount of engine braking may be adjusted via adjusting air flow through the compressor. If method 500 judges that engine braking is desired, the answer is yes and method 500 proceeds to 506. Otherwise, the answer is no and method 500 proceeds to 590.

At 590, method 500 may cease engine rotation or continue engine rotation in a deceleration fuel cut out mode. Method 500 may cease engine rotation if a small driver demand torque is requested and an electric machine is commanded to provide the driver demand torque. Alternatively, or in addition, method 500 may cease engine rotation in response to a small driver demand torque and vehicle speed being zero. Method 500 may continue engine rotation if driver demand is low, vehicle speed is greater than a threshold, and an electric machine is not available to provide torque to the driveline. If method 500 continues engine rotation without combustion to conserve fuel, method 500 closes the EGR valve if catalyst temperature is less than a threshold or method 500 opens the EGR valve if catalyst temperature is greater than the threshold, opens VGT vanes, opens the supercharger bypass valve, engages the supercharger in its lowest drive ratio, deactivates fuel injection to the engine, and fully opens the exhaust valve. Method 500 proceeds to exit.

At 506, method 500 judges if a continuously variable ratio supercharger compressor is degraded or not available. Method 500 may judge that the continuously variable ratio supercharger compressor is not available if a hydraulic pulley actuator is degraded, if the continuously variable ratio supercharger compressor is not present in the present vehicle configuration, or a belt of the continuously variable ratio supercharger compressor is degraded. Controller memory locations may include variables that indicate the presence or absence of continuously variable ratio supercharger degradation. Method 500 may judge the presence or absence of continuously variable ratio supercharger degradation responsive to values of variables. If method 500 judges that continuously variable ratio supercharger degradation is degraded or the continuously variable ratio supercharger is not available, the answer is yes and method 500 proceeds to 650. Otherwise, the answer is no and method 500 proceeds to 508.

At 508, method 500 judges catalyst temperature is greater than a threshold temperature. Catalyst temperature may be measured or inferred via engine air flow, fuel injection timing, and engine speed. If method 500 judges that catalyst temperature is greater than (G.T.) a threshold, the answer is yes and method 500 proceeds to 530. Otherwise, the answer is no and method 500 proceeds to 510.

At 510, method 500 fully closes an EGR valve, ceases fuel delivery to the engine, and closes a supercharger bypass valve. Closing the EGR valve allows exhaust gas to be trapped within the EGR system so that if additional driver demand torque is requested, the EGR valve may be opened so that exhaust gas flows into the engine cylinders to reduce engine NOx production at a time when catalyst efficiency may be low. Fuel flow to the engine ceases, but the engine continues to rotate via the vehicle's kinetic energy supplied to the engine via vehicle wheels. The supercharger bypass valve is closed to increase an amount of work the mechanically driven supercharger performs on air entering the engine. Method 500 proceeds to 512.

At 512, method 500 fully opens VGT vanes and fully opens the exhaust valve (if present) when catalyst temperature is greater than a threshold. Opening the VGT vanes and the exhaust valve allows the continuously variable supercharger compressor to control flow through itself and regulate engine braking. By increasing work performed on air entering the supercharger, the torque applied to the engine crankshaft is increased, thereby increasing engine braking torque. If the catalyst temperature is not greater than a threshold, then the VGT vanes and/or exhaust valve may be partially closed to help maintain catalyst temperature. Method 500 proceeds to 514.

At 514, method 500 adjusts the continuously variable supercharger drive ratio in response to the desired engine braking amount. For example, if desired engine braking torque continually increases, the supercharger drive ratio may be continuously increased via adjusting a radius of a belt positioned between two pulleys to increase work performed on air flowing through the mechanically driven supercharger and engine braking torque. If the desired engine braking torque continually decreases, the supercharger drive ratio may be continuously decreased via adjusting the radius of the belt positioned between the two pulleys to decrease work performed on air flowing through the mechanically driven supercharger and engine braking torque. The supercharger drive ratio (e.g., ratio between the supercharger input shaft and the supercharger output shaft) may be adjusted proportionately with desired engine braking torque. In one example, desired engine braking torque references a function stored in controller memory and the function outputs a desired supercharger drive ratio. The supercharger drive ratios are stored in the function may be empirically determined via adjusting supercharger drive ratios and recording engine braking torque on a dynamometer.

If energy consumption of the mechanically driven supercharger is less than needed to meet the desired engine braking torque with the highest supercharger drive ratio engaged, the exhaust valve may be at least partially closed to provide additional engine braking torque. If energy consumption of the mechanically driven supercharger is greater than needed to meet the desired engine braking torque with the lowest supercharger drive ratio engaged, the exhaust valve may be at least partially closed, or the supercharger bypass may be partially opened, to reduce compressor work and provide less engine braking torque. Method 500 proceeds to 516.

At 516, method 500 judges if a tip-in (e.g., an accelerator pedal depression amount that is increasing) or engine braking exit request is present. If so, method 500 proceeds to 518. Otherwise, method 500 returns to 514. An engine braking exit request may be made via the controller in response to vehicle speed being less than a threshold (e.g., 10 Kilometers/hr), engine speed being less than a threshold (e.g., 800 RPM), or a desire to extend the vehicle's cruising range.

At 518, method 500 adjusts the EGR valve to a position based on engine speed and engine load. The EGR valve may be partially opened to allow exhaust to enter the engine cylinder so as to reduce engine NOx emissions during a tip-in. Method 500 proceeds to 520.

At 520, method 500 resumes fuel injection to reactivate combustion of air and fuel within the engine. In addition, method 500 adjusts VGT vanes position, supercharger drive ratio, and supercharger bypass valve position responsive to engine speed and load. For example, if engine speed is 1000 RPM and engine load is 0.3, VGT vane position may be adjusted to a position responsive to output of a function or table that is referenced by 1000 RPM and 0.3 engine load. The table or function outputs VGT position. The values in the table or function may be empirically determined and selected to reduce engine emissions and improve engine torque production. Similarly, supercharger drive ratio may be adjusted to a ratio responsive to output of a function or table that is referenced by 1000 RPM and 0.3 engine load. The table or function outputs supercharger drive ratio. The values in the table or function may be empirically determined and selected to reduce engine emissions and improve engine torque production. Further, supercharger bypass valve position may be adjusted to a position responsive to output of a function or table that is referenced by 1000 RPM and 0.3 engine load. The table or function outputs supercharger bypass valve position. The values in the table or function may be empirically determined and selected to reduce engine emissions and improve engine torque production. Thus, the engine is restarted and engine actuators are adjusted to provide the desired driver demand torque. Method 500 proceeds to exit.

In this way, a supercharge drive ratio may be adjusted to control air flow through a mechanically driven compressor to increase engine braking. Engine braking may be provided when a catalyst is cold and engine NOx emissions may be reduced via exhaust gases that are stored in EGR passages or conduits when the engine is reactivated.

At 530, method 500 fully opens the EGR valve, ceases fuel delivery to the engine, and closes a supercharger bypass valve. Opening the EGR valve allows air to recirculate from the mechanically driven compressor to the engine cylinder and back to the mechanically driven compressor so that less air may flow to the catalyst, thereby reducing catalyst cooling. By keeping catalyst temperature high, catalyst efficiency may be maintained during engine braking. Engine tailpipe NOx may be maintained low when driver demand increases via flowing exhaust gases to the warm catalyst. Fuel flow to the engine ceases, but the engine continues to rotate via the vehicle's kinetic energy supplied to the engine via vehicle wheels. The supercharger bypass valve is closed to increase an amount of work the mechanically driven supercharger performs on air entering the engine. Method 500 proceeds to 532.

At 532, method 500 opens VGT vanes and fully opens the exhaust valve. Opening the VGT vanes and exhaust valve allows the supercharger compressor to control flow through itself so that engine braking may be continuously varied responsive to desired engine braking torque. By adjusting the drive ratio of the continuously variable supercharger compressor, it may be possible to adjust an amount of work performed on air by the supercharger, thereby adjusting torque applied to the engine crankshaft and engine braking torque. Method 500 proceeds to 534.

At 534, method 500 adjusts a supercharger drive ratio responsive to the desired engine braking torque. For example, if desired engine braking torque increases, the super charger drive ratio may be increased to increase work performed on air flowing through the mechanically driven supercharger. If the desired engine braking torque decreases, the supercharger drive ratio may be decreased to decrease work performed on air flowing through the mechanically driven supercharger. The continuously variable supercharger drive ratio may be adjusted proportionately with desired engine braking torque. In one example, desired engine braking torque references a function stored in controller memory and the function outputs a supercharger drive ratio. The supercharger drive ratios are stored in the function may be empirically determined via adjusting supercharger drive ratios and recording engine braking torques on a dynamometer.

If the energy consumed by the mechanically driven supercharger is insufficient to provide the desired engine braking torque when the highest supercharger drive ratio is engaged, the exhaust valve may be at least partially closed to increase the engine braking torque so that the desired engine braking torque may be provided. Method 500 proceeds to 536.

At 536, method 500 judges if a tip-in (e.g., an accelerator pedal depression amount that is increasing) or engine braking exit request is present. If so, method 500 proceeds to 538. Otherwise, method 500 returns to 534. An engine braking exit request may be made via the controller in response to vehicle speed being less than a threshold, engine speed being less than a threshold, or a desire to extend the vehicle's cruising range.

At 538, method 500 method 500 adjusts the EGR valve to a position based on engine speed and engine load. The EGR valve may be partially opened to allow exhaust to enter the engine cylinder so as to reduce engine NOx emissions during a tip-in. Method 500 proceeds to 520.

At 550, method 500 judges catalyst temperature is greater than a threshold temperature. Catalyst temperature may be measured or inferred via engine air flow, fuel injection timing, and engine speed. If method 500 judges that catalyst temperature is greater than (G.T.) a threshold, the answer is yes and method 500 proceeds to 570. Otherwise, the answer is no and method 500 proceeds to 552.

At 552, method 500 fully closes an EGR valve, ceases fuel delivery to the engine, and fully opens VGT vanes. Closing the EGR valve allows exhaust gas to be trapped within the EGR system so that if additional driver demand torque is requested, the EGR valve may be opened so that exhaust gas flows into the engine cylinders to reduce engine NOx production at a time when catalyst efficiency may be low. Fuel flow to the engine ceases, but the engine continues to rotate via the vehicle's kinetic energy supplied to the engine via vehicle wheels. The VGT vanes are opened to allow the supercharger bypass valve to control flow through the supercharger with less exhaust manifold pressure effects. Method 500 proceeds to 554.

At 554, method 500 operates the mechanically driven supercharger in its highest drive ratio. Increasing the drive ratio of the supercharger increases an amount of work performed on air by the supercharger, thereby increasing torque applied to the engine crankshaft and engine braking torque. Method 500 proceeds to 556.

At 556, method 500 adjusts a position of the supercharger bypass valve responsive to the desired engine braking torque. For example, if desired engine braking torque increases, the bypass valve may be closed further to increase work performed on air flowing through the mechanically driven supercharger. If the desired engine braking torque decreases, the supercharger bypass valve may be opened further to decrease work performed on air flowing through the mechanically driven supercharger. The supercharger bypass valve position may be adjusted proportionately with desired engine braking torque. In one example, desired engine braking torque references a function stored in controller memory and the function outputs a supercharger bypass valve position. The supercharger bypass valve positions stored in the function may be empirically determined via adjusting supercharger bypass valve positions and recording engine braking torques on a dynamometer.

If energy consumption of the mechanically driven supercharger is greater than needed to meet the desired engine braking torque with the supercharger bypass valve fully closed, the supercharger drive ratio is reduced and the supercharger bypass valve may be partially opened to provide the desired engine braking torque. Conversely, if the energy consumed by the mechanically driven supercharger is insufficient to provide the desired engine braking torque when the supercharger bypass valve is are fully closed, the drive ratio of the mechanically driven supercharger may be increased to increase the engine braking torque so that the desired engine braking torque may be provided. Method 500 proceeds to 558.

At 558, method 500 judges if a tip-in (e.g., an accelerator pedal depression amount that is increasing) or engine braking exit request is present. If so, method 500 proceeds to 560. Otherwise, method 500 returns to 556. An engine braking exit request may be made via the controller in response to vehicle speed being less than a threshold, engine speed being less than a threshold, or a desire to extend the vehicle's cruising range.

At 560, method 500 adjusts the EGR valve to a position based on engine speed and engine load. The EGR valve may be partially opened to allow exhaust to enter the engine cylinder so as to reduce engine NOx emissions during a tip-in. Method 500 proceeds to 562.

At 562, method 500 resumes fuel injection to reactivate combustion of air and fuel within the engine. In addition, method 500 adjusts VGT vanes position, supercharger drive ratio, and supercharger bypass valve position responsive to engine speed and load. Thus, the engine is restarted and engine actuators are adjusted to provide the desired driver demand torque. Method 500 proceeds to exit.

At 570, method 500 fully opens an EGR valve, ceases fuel delivery to the engine, and fully opens VGT vanes. Opening the EGR valve allows air to recirculate from the mechanically driven compressor to the engine cylinder and back to the mechanically driven compressor so that less air may flow to the catalyst, thereby reducing catalyst cooling. By keeping catalyst temperature high, catalyst efficiency may be maintained during engine braking. Engine tailpipe NOx may be maintained low when driver demand increases via flowing exhaust gases to the warm catalyst. Fuel flow to the engine ceases, but the engine continues to rotate via the vehicle's kinetic energy supplied to the engine via vehicle wheels. The VGT vanes are fully opened allow the supercharger bypass valve to control air flow through the supercharger compressor with little interference from the exhaust system. Method 500 proceeds to 572.

At 572, method 500 operates the mechanically driven supercharger in its highest drive ratio. Increasing the drive ratio of the supercharger increases an amount of work performed on air by the supercharger, thereby increasing torque applied to the engine crankshaft and engine braking torque. Method 500 proceeds to 574.

At 574, method 500 adjusts a position of the supercharger bypass valve responsive to the desired engine braking torque. For example, if desired engine braking torque increases, the supercharger bypass valve may be closed further to increase work performed on air flowing through the mechanically driven supercharger. If the desired engine braking torque decreases, the supercharger bypass valve may be opened further to decrease work performed on air flowing through the mechanically driven supercharger. The supercharger bypass valve position may be adjusted proportionately with desired engine braking torque. In one example, desired engine braking torque references a function stored in controller memory and the function outputs a supercharger bypass valve position. The supercharger bypass valve positions stored in the function may be empirically determined via adjusting supercharger bypass valve position and recording engine braking torque on a dynamometer.

If energy consumption of the mechanically driven supercharger is greater than needed to meet the desired engine braking torque with the supercharger bypass valve fully open, the supercharger drive ratio is reduced and the supercharger bypass valve may be partially closed to provide the desired engine braking torque. Conversely, if the energy consumed by the mechanically driven supercharger is insufficient to provide the desired engine braking torque when the supercharger bypass valve is fully closed, the drive ratio of the mechanically driven supercharger may be increased to increase the engine braking torque so that the desired engine braking torque may be provided. Method 500 proceeds to 576.

At 576, method 500 judges if a tip-in (e.g., an accelerator pedal depression amount that is increasing) or engine braking exit request is present. If so, method 500 proceeds to 578. Otherwise, method 500 returns to 574. An engine braking exit request may be made via the controller in response to vehicle speed being less than a threshold, engine speed being less than a threshold, or a desire to extend the vehicle's cruising range.

At 578, method 500 adjusts the EGR valve to a position based on engine speed and engine load. The EGR valve may be partially opened to allow exhaust to enter the EGR passage so as to engine feedgas NOx (e.g., NOx directly output from the engine) may be reduced. Method 500 proceeds to 562.

Thus, method 500 provides for a two stroke diesel engine braking method, comprising: completing cycles of all engine cylinders in two revolutions of an engine; and continuously adjusting engine braking torque of the engine without increasing engine pumping work of the engine via continuously adjusting a drive ratio of the mechanically driven supercharger in response to a request for engine braking. The two stroke diesel engine braking method includes where continuously adjusting the drive ratio of the mechanically driven supercharger includes increasing the drive ratio of the mechanically driven supercharger responsive to an increase in desired engine braking, and further comprising: at least partially closing an exhaust valve to decrease work of the mechanically driven supercharger when continuously adjusting the drive ratio is insufficient to reduce engine braking torque to a desired engine braking torque. The two stroke diesel engine braking method includes where continuously adjusting the drive ratio of the mechanically driven supercharger includes decreasing the drive ratio of the mechanically driven supercharger responsive to a decrease in desired engine braking. The two stroke diesel engine braking method further comprises closing a supercharger bypass valve in response to the request for engine braking.

In some examples, the two stroke diesel engine braking method further comprises fully closing vanes of a variable geometry turbocharger. The two stroke diesel engine braking method further comprises closing an EGR valve in response to the request for engine braking and a temperature of a catalyst being less than a threshold temperature. The two stroke diesel engine braking method further comprises opening the EGR valve in response to the request for engine braking and the temperature of the catalyst being greater than the threshold temperature.

Method 500 also provides for a two stroke diesel engine braking method, comprising: opening an exhaust port of a cylinder of an engine for an entire duration an intake port of the cylinder is open and flowing air to the cylinder via a mechanically driven supercharger; and increasing engine braking without increasing engine pumping work via adjusting net air flow through the mechanically driven supercharger via adjusting a position of a bypass valve of the mechanically driven supercharger in response to a request for engine braking. The two stroke diesel engine braking method includes where net air flow through the mechanically driven supercharger is air flow that enters the engine. The two stroke diesel engine braking method further comprises increasing a drive ratio of a supercharger in response to the request for engine braking. The two stroke diesel engine braking method further comprises opening an EGR valve in response to the request for engine braking and a temperature of a catalyst exceeding a threshold.

In some examples, the two stroke diesel engine braking method further comprises closing an EGR valve and storing exhaust gas in an exhaust gas passage in response to the request for engine braking and a temperature of a catalyst being less than a threshold. The two stroke diesel engine braking method further comprises opening the EGR valve and inducting the stored exhaust gas in response to applying an accelerator pedal. The two stroke diesel engine braking method further comprises fully opening vanes of a variable geometry turbocharger.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A two stroke diesel engine braking method, comprising:
completing cycles of all engine cylinders in two revolutions of a two stroke diesel engine;
continuously adjusting engine braking torque of the two stroke diesel engine without increasing engine pumping work of the engine via continuously adjusting a drive ratio of a mechanically driven supercharger in response to a request for engine braking;
closing an EGR valve in response to the request for engine braking and a temperature of a catalyst being less than a threshold temperature; and
opening the EGR valve in response to withdrawing the request for engine braking and the temperature of the catalyst being less than the threshold temperature.

2. The two stroke diesel engine braking method of claim 1, where continuously adjusting the drive ratio of the mechanically driven supercharger includes increasing the drive ratio of the mechanically driven supercharger responsive to an increase in desired engine braking, and further comprising:
at least partially closing an exhaust valve to increase work of the mechanically driven supercharger when continuously adjusting the drive ratio is insufficient to increase engine braking torque to a desired engine braking torque.

3. The two stroke diesel engine braking method of claim 2, where continuously adjusting the drive ratio of the mechanically driven supercharger includes decreasing the drive ratio of the mechanically driven supercharger responsive to a decrease in desired engine braking.

4. The two stroke diesel engine braking method of claim 1, further comprising:
closing a supercharger bypass valve in response to the request for engine braking; and
closing the EGR valve, opening the supercharger bypass valve, opening vanes of a variable geometry turbocharger, engaging a lowest ratio of the mechanically driven supercharger, ceasing fuel injection to the two stroke diesel engine, and fully opening an exhaust valve in response to combustion in the two stroke diesel engine not being desired and engine braking not being desired.

5. The two stroke diesel engine braking method of claim 1, further comprising fully opening vanes of a variable geometry turbocharger.

6. The two stroke diesel engine braking method of claim 1, further comprising fully opening the EGR valve and increasing a vane opening amount of a variable geometry turbocharger as a desired braking torque increases.

7. A two stroke diesel engine braking method, comprising:
opening an exhaust port and an intake port of a cylinder of a two stroke diesel engine and flowing air to the cylinder via a mechanically driven supercharger;
increasing engine braking of the two stroke engine without increasing engine pumping work via adjusting net air flow through the mechanically driven supercharger, the net air flow adjusted via adjusting a position of a bypass valve of the mechanically driven supercharger in response to a request for engine braking;
adjusting vanes of a variable geometry turbocharger responsive to the request for engine braking and in response to an exhaust valve being unavailable; and
closing an EGR valve in response to the request for engine braking and a temperature of a catalyst being less than a threshold temperature; and
opening the EGR valve in response to withdrawing the request for engine braking and the temperature of the catalyst being less than the threshold temperature.

8. The two stroke diesel engine braking method of claim 7, where the exhaust valve being unavailable includes the exhaust valve not being present or exhaust valve temperature being greater than a threshold, and where the net air flow through the mechanically driven supercharger is air flow that enters the engine.

9. The two stroke diesel engine braking method of claim 7, further comprising:
increasing a drive ratio of the mechanically driven supercharger in response to the request for engine braking; and
closing the EGR valve, opening the bypass valve of the mechanically driven supercharger, opening vanes a turbocharger turbine, engaging a lowest ratio of the mechanically driven supercharger, ceasing fuel injection to the two stroke diesel engine in response to combustion in the two stroke diesel engine not being desired and engine braking not being desired.

10. The two stroke diesel engine braking method of claim 7, further comprising opening the EGR valve in response to the request for engine braking and the temperature of the catalyst exceeding the threshold temperature.

11. The two stroke diesel engine braking method of claim 7, further comprising closing the EGR valve and storing exhaust gas in an exhaust gas passage in response to the request for engine braking and the temperature of the catalyst being less than the threshold temperature.

12. The two stroke diesel engine braking method of claim 11, further comprising opening the EGR valve and inducting the stored exhaust gas in response to applying an accelerator pedal.

13. The two stroke diesel engine braking method of claim 7, further comprising fully opening vanes of the variable geometry turbocharger.

14. An engine system, comprising:
an opposed piston two stroke diesel engine including fuel injectors, a catalyst, and an EGR valve;
a supercharger coupled to the opposed piston two stroke diesel engine, the supercharger having continuously variable drive ratios;
a turbocharger coupled to the opposed piston two stroke diesel engine; and
a controller including executable instructions stored in non-transitory memory to adjust engine braking via continuously adjusting supercharger flow without increasing engine pumping work in response to a request for engine braking, executable instructions to close the EGR valve in response to the request for engine braking and a temperature of the catalyst being less than a threshold temperature, and executable instructions to open the EGR valve in response to withdrawing the request for engine braking and the temperature of the catalyst being less than the threshold temperature.

15. The engine system of claim 14, further comprising additional instructions to adjust supercharger flow via a supercharger drive ratio changing device, and additional instructions to increase engine braking without increasing engine pumping work via adjusting flow through the supercharger via adjusting a position of vanes of a turbocharger turbine of the turbocharger in response to the request for engine braking and in response to an exhaust valve being unavailable.

16. The engine system of claim 14, further comprising additional instructions to adjust supercharger flow via a position of a supercharger bypass valve in response to the request for engine braking.

* * * * *